United States Patent [19]

Hashimoto et al.

[11] 4,301,269
[45] Nov. 17, 1981

[54] ROOM TEMPERATURE CURING POLYSILOXANE COMPOSITIONS

[75] Inventors: Mitsuyoshi Hashimoto, Ojimamchi; Kiyoshi Hosokawa, Ota; Tsuneo Motegi, Ouramachi, all of Japan

[73] Assignee: Toshiba Silicone Co., Ltd., Tokyo, Japan

[21] Appl. No.: 110,060

[22] Filed: Jan. 7, 1980

[30] Foreign Application Priority Data

Jan. 12, 1979 [JP] Japan .................... 54-2517

[51] Int. Cl.$^3$ .............................................. C08G 77/04
[52] U.S. Cl. .................... 528/34; 260/18 S; 260/37 SB; 528/26; 528/18; 528/33
[58] Field of Search ............ 528/34, 26, 18, 33; 260/18 S, 37 SB

[56] References Cited

U.S. PATENT DOCUMENTS 3,035,016  5/1962  Bruner .................................. 528/34
3,318,843  5/1967  Bluestein ............................... 528/34
3,714,089  1/1973  Hamilton et al. ................... 260/18 S

*Primary Examiner*—Melvyn I. Marquis

*Attorney, Agent, or Firm*—Blanchard, Flynn, Thiel, Boutell & Tanis

[57] ABSTRACT

A storage-stable, room-temperature-curing polysiloxane composition comprising polydiorganosiloxane having silanol terminal radicals and from 0.5 to 25 parts by weight, per 100 parts by weight of said polydiorganosiloxane, of a curing agent containing from 1.5 to 100 wt. % of silane having the formula

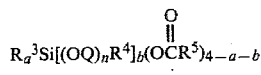

wherein $R^3$ is a substituted or unsubstituted hydrocarbon radical, Q is alkylene or alkylidene, $R^4$ is

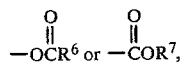

wherein $R^6$ and $R^7$ are substituted or unsubstituted hydrocarbon radicals, $R^5$ is hydrogen or a substituted or unsubstituted hydrocarbon radical, n is 1 or 2, a is 0 or 1 and b is 1, 2, 3 or 4, and the balance of the curing agent is tri-acyloxysilane.

21 Claims, No Drawings

ROOM TEMPERATURE CURING POLYSILOXANE COMPOSITIONS

The present invention relates to room-temperature-curing polysiloxane compositions (RTV silicone elastomers) which can be stored in a stable condition for a long period of time in the absence of moisture, but which release organic acids and thereby are cured to form rubber-like elastomers upon exposure to moisture. Particularly, the present invention relates to one package room-temperature-curing polysiloxane compositions which have an excellent storage stability, improved flow properties and adhesion properties and a curing velocity which is controllable at will.

There have been known one package room-temperature-curing polysiloxane compositions which can be stored for a long period of time in the absence of moisture, but which release organic acids, such as acetic acid, to form elastomers upon exposure to moisture. They have been widely used as sealants for construction and other industries. Generally, methyltriacetoxysilane is used as a cross-linking agent for those compositions. However, even though methyltriacetoxysilane is inexpensive and effective, methyltriacetoxysilane has the disadvantage that a composition containing methyltriacetoxysilane is easily crystallized during storage to cause a practical inconvenience, because the melting point of methyltriacetoxysilane is higher than room temperature. Another disadvantage of such compositions is that, in the absence of a primer, the adhesion properties thereof to substrates are poor. Known methods of overcoming those disadvantages include (1) a method wherein a partial hydrolyzate of methyltriacetoxysilane is used in place of methyltriacetoxysilane per se (Japanese Patent Publication No. 17911/1972), (2)-(a) a method wherein methyltriacetoxysilane is used in combination with a compound which is difficultly crystallized at room temperature such as dibutoxydiacetoxysilane (Japanense Patent Publication No. 18627/1968), (2)-(b) a method wherein a reaction product of methyltriacetoxysilane and butoxyacetoxysilanes is used (Japanese Patent Laid-Open No. 63799/1974), (3) a method wherein a siloxane or a combination of a siloxane and a silane containing an acetoxy group and an alkoxy group bonded with the silicon atom is used (Japanese Patent Publication No. 7578/1974). The disadvantages of methods (1) and (2)-(a) are that the effects thereof for preventing crystallization during the storage at a low temperature are poor and that control of the curing velocity is difficult. In method (2)-(b), the control of the curing rate is not improved, even though the crystallization of the cross-linking agent can be prevented. Method (3) is disadvantageous with respect to the ease of the production process, because it is essential to use the siloxane as a cross-linking agent for improving the adhesion properties and, in addition, if a silane is used along, the adhesion properties are insufficient. Another disadvantage is that a non-sag thixotropic property is scarcely imparted thereto, the thixotropic property being a very important property when the materials are used as sealants for construction purposes.

The present invention overcomes the disadvantages of the conventional methods and provides one package room-temperature-curing polysiloxane compositions which have excellent adhesion properties, a complete non-sag thixotropic property and a curing velocity which can be controlled at will, and which compositions are not crystallized during storage.

The present invention relates to room-temperature-curing polysiloxane compositions consisting essentially of:

(A) a polydiorganosiloxane having silanol terminal radicals and a viscosity of 500–200,000 cSt at 25° C., (B) an acyloxy radical-containing organosilicon compound selected from the group consisting of acyloxy radical-containing silanes of the general formula:

wherein $R^1$ and $R^2$ each represent a monovalent, substituted or unsubstituted hydrocarbon radical, and partial hydrolyzates thereof, and (C) an organosilane compound selected from the group consisting of acyloxy radical-containing silanes of the general formula:

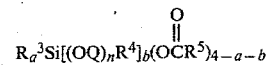

wherein $R^3$ represents a monovalent, substituted or unsubstituted hydrocarbon radical, Q represents the same or different alkylene or alkylidene radicals, n represents a number of 1 or 2, $R^4$ represents an ester bond-containing radical of the general formula:

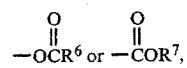

$R^6$ and $R^7$ being a monovalent, substituted or unsubstituted hydrocarbon radical, $R^5$ represents a monovalent radical selected from the group consisting of hydrogen atom and monovalent, substituted or unsubstituted hydrocarbon radicals, a represents a number of 0 or 1 and b represents an integer of 1–4, and partial hydrolyzates thereof, the sum of (B) and (C) being 0.5 to 25 parts by weight per 100 parts by weight of component (A), the amount of (B) being from zero up to 98.5 wt. % based on the sum of (B) and (C), and the amount of (C) being at least 1.5 wt. % based on the sum of (B) and (C).

Component (A) used in the present invention is a polydiorganosiloxane having silanol terminal radicals customarily contained in the condensation type room-temperature-curing siloxane compositions. The viscosity of component (A) at 25° C. is in the range of 500 to 200,000 cSt for imparting suitable extruding properties to the composition before curing and excellent mechanical properties to the cured rubber-like elastomers. If the viscosity is below 500 cSt, the elongation of the rubber-like elastomers is insufficient. If the viscosity is above 200,000 cSt, on the other hand, a homogeneous composition cannot be obtained and the extrusion workability is poor. A particularly preferred viscosity range for the component (A), for controlling the properties of the composition before and after the curing is 3,000 to 150,000 cSt. As the organic radicals which are directly bonded with the silicon atoms, there can be mentioned, for example, alkyl radicals such as methyl radical, ethyl radical, propyl radical, butyl radical and hexyl radical; alkenyl radicals such as vinyl radical and allyl radical; aryl radicals such as phenyl radical; aralkyl radicals such as styrenyl radical; and monovalent, substituted hydrocarbon radicals such as 3,3,3-trifluoropropyl radical, chloromethyl radical and β-cyanoethyl radical. In view of the ease of the synthesis, hydrocarbon radicals such as methyl radical, vinyl radical and phenyl radical are generally advantageous. The other organic radicals are recommended only when special properties, such as oil resistance and paintability, are to be imparted to the cured rubber-like elastomers. It is preferred that at least 85% of the total organic radicals are methyl radicals and it is more preferred that substantially all of the organic radicals are methyl radicals, because the intermediate containing methyl radicals can be obtained most easily, the methyl radicals impart the lowest viscosity relative to the polymerization degree of the siloxane and the methyl radicals control the balance between the extrusion workability of the non-cured composition and the physical properties of the cured elastomers. However, when cold resistance, heat resistance or transparency is required of the cured elastomers, it is recommended to use phenyl radicals as a part of the organic radicals, i.e. up to 15%.

Component (B) used in the present invention is a cross-linking agent for curing the composition into the elastomers by reaction with the silanol radical of component (A), together with component (C). Components (B) are silane compounds of the general formula:

$$R^1Si(OCR^2)_3$$
$$\phantom{R^1Si(O}\overset{\displaystyle O}{\|}\phantom{R^2)_3}$$

wherein $R^1$ and $R^2$ have the same meanings as set forth above, and/or partial hydrolyzates thereof. Those silane compounds are synthesized by reacting corresponding organochlorosilanes with acid anhydrides such as acetic anhydride or sodium salts or potassium salts of organic acids. As the radicals $R^1$, there can be mentioned alkyl radicals such as methyl radical, ethyl radical and propyl radical; alkenyl radicals such as vinyl radical and allyl radical; aryl radicals such as phenyl radical; and substituted hydrocarbon radicals such as 3,3,3-trifluoropropyl radical and β-cyanoethyl radical. In view of the ease of the synthesis and the handling, alkyl radicals of 1 to 8 carbon atoms, alkenyl radicals of 2 or 3 carbon atoms and phenyl radical are preferred. The methyl radical is most preferred. As the radical $R^2$, there can be mentioned alkyl radicals such as methyl radical, ethyl radical, propyl radical, butyl radical, pentyl radical, hexyl radical, heptyl radical, octyl radical and lauryl radical; alkenyl radicals such as vinyl radical and allyl radical; and aryl radicals such as phenyl radical. In view of the ease of synthesis and handling, alkyl radicals of 1 to 8 carbon atoms, alkenyl radicals of 2 to 3 carbon atoms and phenyl radical are preferred. Among them, the methyl radical is most preferred. Concrete examples of component (B) are as follows:

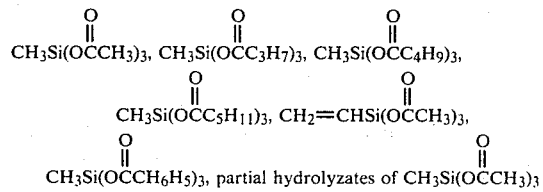

and partial hydrolyzates of $CH_2=CHSi(OCCH_3)_3$.

Component (B) is used in such an amount that the sum of components (B) and (C) is 0.5 to 25 parts by weight per 100 parts by weight of component (A) and that the amount of component (B) is from zero to 98.5 wt. % based on the sum of components (B) and (C).

Thus, component (B) is not critical in the present invention and component (C) can be used alone as the cross-linking agent. If component (B) is used in an amount of more than 98.5 wt. % based on the sum of components (B) and (C), namely if the amount of component (C) which will be described below is less than 1.5 wt. %, the effect of preventing the crystallization of the cross-linking agent cannot be obtained. For attaining this object more surely, it is preferred that component (C) is used in an amount of more than 20 wt. %. In view of the physical properties of the cured composition and the cost, it is preferred, however, that component (B) is contained therein in an amount of more than 5 wt. % based on the sum of components (B) and (C). The reasons why the sum of (B) and (C) is limited to 0.5 to 25 parts by weight per 100 parts by weight of component (A) are that if it is more than 25 parts by weight, those components (B) and (C) may be separated out or eluted from the mixture during storage of the composition and that if it is less than 0.5 part by weight, partial gelation is apt to occur in the preparation of the composition and the storage stability for a long period of time is damaged. The preferred range of the sum of (B) and (C) is 2 to 10 parts by weight, per 100 parts by weight of (A).

Component (C) is critical for attaining the object of the present invention. By using component (C), there is obtained the intended room-temperature-curing polysiloxane composition of the acid-releasing type, from which the cross-linking agent does not crystallize out during storage. Component (C) is an acyloxy group-containing silane of the general formula:

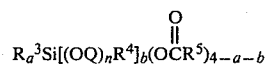

wherein $R^3$, $R^4$, $R^5Q$, n, a and b have the same meanings as set forth above, and/or a partial hydrolyzate thereof. Component (C) can be obtained by the following methods: (1) a method wherein a corresponding organochlorosilane is reacted with an acid anhydride and the reaction product is partially alkoxylated with an alcohol having a corresponding organic carboxylic acid ester radical, (2) a method wherein a corresponding organochlorosilane is partially alkoxylated with an alcohol having a corresponding organic carboxylic ester radical and the product is then reacted with an organic carboxylic salt such as sodium or potassium salt of an organic carboxylic acid, (3) a method wherein a corresponding acyloxysilane is partially hydrolyzed and then the partial hydrolyzate is partially alkoxylated, and (4) a method wherein a corresponding organochlorosilane is partially hydrolyzed and then the partial hydrolyzate is alkoxylated or acyloxylated.

As the preferred radical $R^3$, in view of the ease of synthesis and handling, there can be mentioned alkyl radicals of 1 to 8 carbon atoms such as methyl radical, ethyl radical, propyl radical, butyl radical, pentyl radical, hexyl radical and octyl radical; alkenyl radicals of 2 or 3 carbon atoms such as vinyl radical and allyl radical; and phenyl radical. Among them, the methyl radical is preferred in view of the ease of the synthesis and handling. Radical $R^3$ further includes other alkyl radicals and alkenyl radicals as well as aralkyl radicals such as styrenyl radical and substituted hydrocarbon radicals such as 3,3,3-trifluoropropyl radical, chloromethyl radical and β-cyanoethyl radical. As the radical Q, alkylene or alkylidene radicals of 1 to 3 carbon atoms such as methylene radical, ethylene radical, propylene radical and ethylidene radical are preferred when n is 1 in view of the ease of handling and the curing reactivity. When n is 2, it is preferred that the radical Q on the silicon atom side is an ethylene radical and the radical Q on the opposite side is an alkylene radical of 1 or 2 carbon atoms. For the same reasons, radicals of the following general formulae are preferred as radical $R^4$:

$$-\underset{\underset{O}{\|}}{C}OR^8$$

wherein $R^8$ represents methyl radical, ethyl radical or propyl radical, and $$-\underset{\underset{O}{\|}}{O}CR^9$$

wherein $R^9$ represents methyl radical, ethyl radical or propyl radical. As the radicals $R^5$, there can be mentioned the organic radicals mentioned above for $R^3$ and hydrogen atom. For imparting suitable curing properties to the composition, hydrogen atom and methyl radical are most preferred for $R^5$.

Specific examples of components (C) are as follows:

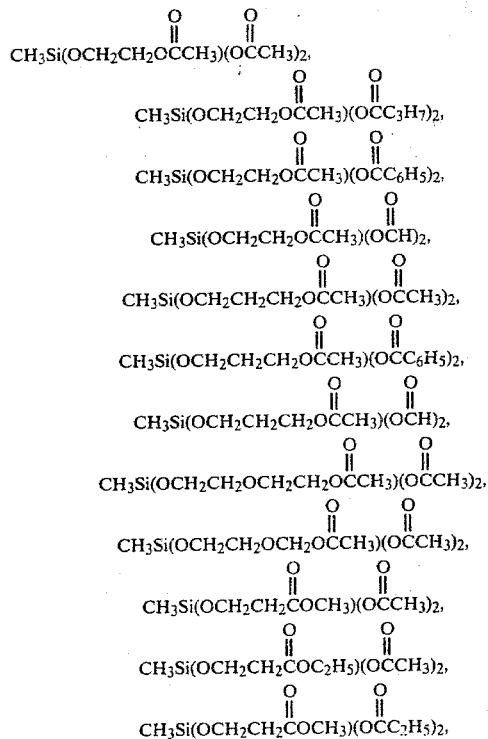

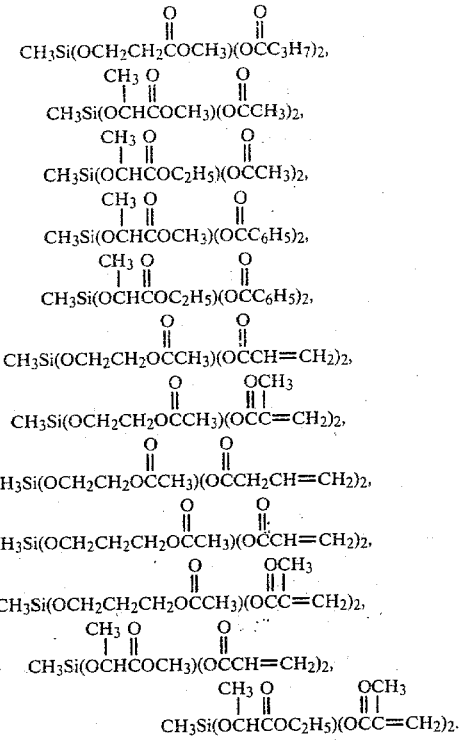

As components (C), there can further be mentioned the same silane compounds as above except that the methyl radical bonded with the silicon atom is replaced with vinyl or phenyl radical or that the values of a and b (which both are 1 in the above compounds) are altered to a=1 and b=2 or 3, or to a=0 and b=1, 2, 3 or 4. However, when only component (C) is used as a cross-linking agent and the composition prepared is to be stored together with the catalyst in a vessel for a long period of time, namely, in case the composition is of the one-package type, it is necessary that the sum of a and b does not exceed 3 from the viewpoint of storage stability. This limitation does not apply in the case wherein component (B) is used together with component (C) as the cross-linking agent or the case wherein the composition is of the so-called two-package type, wherein the cross-linking agent and the catalyst are stored separately from each other and they are mixed and thereby cured in situ. Further, mixtures of those silane compounds and partial hydrolyzates can also be used.

It is preferred to incorporate an inorganic filler in the composition of the present invention comprising components (A) to (C). By the incorporation of the inorganic filler, a suitable fluidity and extruding property are obtained before the curing and a suitable mechnical strength is obtained after the curing. As the filler, there can be used those known in the art such as fumed silica, precipitated silica, pulverized silica, diatomaceous earth, iron oxide, titanium oxide and calcium carbonate. They can be used either alone or in the form of a mixture of two or more of them. Further, they can be used as they are or they can be treated with an organosilicon compound such as polydimethylsiloxane, octamethylcyclotetrasiloxane and hexamethyldisilazane.

It is preferred to incorporate a catalyst in the composition of the present invention for accelerating the curing reaction. As the catalyst, there are favorably used organotin compounds such as tin octoate dibutyltin diacetate, dibutyltin dilaurate, dibutyltin dioctoate, diphenyltin diacetate and dioctyltin dilaurate. In addition, metal carboxylates such as cobalt and naphthenate and lead octoate may also be used. The amount of the catalyst is not particularly critical. For example, when dibutyltin dilaurate is used, a suitable amount thereof is 0.02–1 part by weight per 100 parts by weight of component (A).

In addition, various other additives can be incorporated in the composition of the present invention. The additives include pigments, thixotropic agents, viscosity modifiers for improving the extrusion workability, ultraviolet inhibitors, moldproofing agents, heat resistance-improving agents and flame retardants.

The composition of the present invention is prepared by mixing components (A) to (C) and, if necessary, an inorganic filler, catalyst and other additives, under water vapor-free conditions. The composition is stored in a closed vessel and is used as one package room-temperature-curing polysiloxane composition which is to be cured upon exposure to moisture in the ambient air. The composition can also be used as a two package room-temperature-curing polysiloxane composition. In the latter case, component (A) and the filler are stored separately from components (B) and (C) and the catalyst, and the components in the two packages are mixed together at the time of use.

By preventing the crystallization of the cross-linking agent during storage, according to the present invention, the room-temperature-curing polysiloxane composition of the acid-releasing type having an excellent storage stability, can be obtained. The curing rate of the composition of the present invention can be controlled at will. The composition has a non-sag thixotropic property, which is a fundamental, indispensable property required of the composition when it is used as a sealing material for construction, and it has excellent adhesion properties. The composition of the present invention having said properties is used mainly as sealants for the construction industry and also as sealants in various other industries.

Illustrative preparations and examples of the present invention will be given below. In the preparations and examples, the term "parts" means parts by weight.

Preparation 1 (Invention)

301 Grams (1 mole) of methyltriacetoxysilane were charged in a 500 ml four-neck flask. 104 Grams (1 mole) of 2-hydroxyethyl acetate were added dropwise thereto at a liquid temperature of 35° C., under a water vapor-free atmosphere, to effect the reaction for two hours. The acetic acid thus formed was distilled out at 80° C. under a reduced pressure of 30 mmHg whereby to obtain cross-linking agent mixture 1 comprising 17.4% of

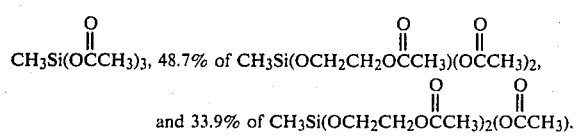

Preparation 2 (Invention)

301 Grams (1 mole) of methyltriacetoxysilane were charged in a 500 ml four-neck flask. 118 Grams (1 mole) of 3-hydroxypropyl acetate were added dropwise thereto at a liquid temperature of 35° C., under a water vapor-free atmosphere, to effect the reaction for three hours. The acetic acid thus formed was distilled out at 80° C. under a reduced pressure of 30 mmHg to obtain a cross-linking agent mixture 2 comprising 41.9% of

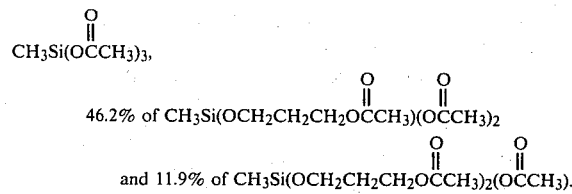

Preparation 3 (Invention)

Preparation 3 (Invention)

301 Grams (1 mole) of methyltriacetoxysilane were charged in a 500 ml four-neck flask. 104 Grams (1 mole) of methyl lactate were added dropwise thereto at a liquid temperature of 35° C., under a water vapor-free atmosphere to effect the reaction for one hour. The acetic acid thus formed was distilled out at 80° C. under a reduced pressure of 30 mmHg to obtain a cross-linking agent mixture 3 comprising 16.5% of

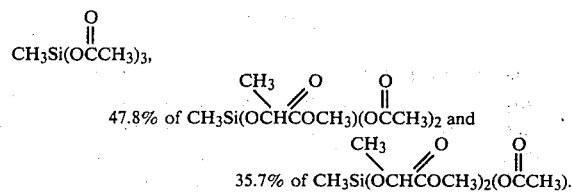

Preparation 4 (Comparison)

301 Grams (1 mole) of methyltriacetoxysilane were charged in a 500 ml four-neck flask. 46 Grams (1 mole) of ethyl alcohol were added dropwise thereto at a liquid temperature of 35° C., under a water vapor-free atmosphere, to effect the reaction for one hour. The acetic acid thus formed was distilled out at 80° C. under a reduced pressure of 30 mmHg to obtain a cross-linking agent mixture 4 comprising 26.6% of

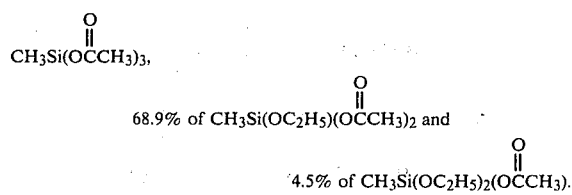

Preparation 5 (Comparison)

301 Grams (1 mole) of methyltriacetoxysilane were charged in a 500 ml four-neck flask. 60 Grams (1 mole) of n-propyl alcohol were added dropwise thereto at a liquid temperature of 35° C., u nder a water vapor-free atmosphere, to effect the reaction for one hour. The acetic acid thus formed was distilled out at 80° C. under a reduced pressure of 30 mmHg to obtain a cross-linking agent mixture 5 comprising 70.0% of

26.3% of CH$_3$Si(O—n-C$_3$H$_7$)(OCCH$_3$)$_2$ and 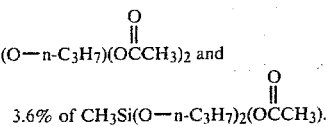

3.6% of CH$_3$Si(O—n-C$_3$H$_7$)$_2$(OCCH$_3$).

Preparation 6 (Comparison)

301 Grams (1 mole) of methyltriacetoxysilane were charged in a 500 ml four-neck flask. 74 Grams (1 mole) of t-butyl alcohol were added dropwise thereto at a liquid temperature of 35° C., under a water vapor-free atmosphere, to effect the reaction for 1.5 hours. The acetic acid thus formed was distilled out at 80° C. under a reduced pressure of 30 mmHg to obtain a cross-linking agent mixture 6 comprising 74.5% of

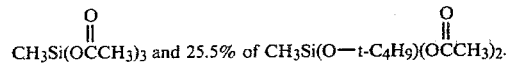

CH$_3$Si(OCCH$_3$)$_3$ and 25.5% of CH$_3$Si(O—t-C$_4$H$_9$)(OCCH$_3$)$_2$.

Preparation 7 (Invention)

313 Grams (1 mole) of vinyltriacetoxysilane were charged in a 500 ml four-neck flask. 236 Grams (2 moles) of ethyl lactate were added dropwise thereto at a liquid temperature of 40° C., under a water vapor-free atmosphere, to effect the reaction for 1.5 hours. The acetic acid thus formed was distilled out at 80° C. under a reduced pressure of 30 mmHg to obtain a cross-linking agent mixture 7 comprising 25.5% of

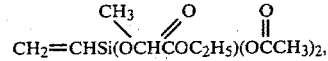

CH$_2$=CHSi(OCHCOC$_2$H$_5$)(OCCH$_3$)$_2$,

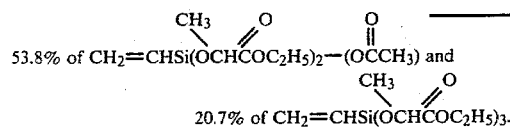

53.8% of CH$_2$=CHSi(OCHCOC$_2$H$_5$)$_2$—(OCCH$_3$) and 20.7% of CH$_2$=CHSi(OCHCOC$_2$H$_5$)$_3$.

Preparation 8 (Invention)

301 Grams (1 mole) of methyltriacetoxysilane were charged in a 500 ml four-neck flask. 148 Grams (1 mole) of diethylene glycol monomethyl acetate were added dropwise thereto at a liquid temperature of 35° C., under a water vapor-free atmosphere, to effect the reaction for two hours. The acetic acid thus formed was distilled out at 80° C. under a reduced pressure of 30 mmHg to obtain a cross-linking agent mixture 8 comprising 19.4% of CH$_3$Si(OCCH$_3$)$_3$, 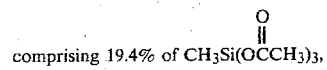

47.8% of CH$_3$Si(OCH$_2$CH$_2$OCH$_2$CH$_2$OCCH$_3$)(OCCH$_3$)$_2$ and 

32.8% of CH$_3$Si(OCH$_2$CH$_2$OCH$_2$CH$_2$OCCH$_3$)$_2$(OCCH$_3$).

EXAMPLE 1

Cross-linking agent mixtures 1–8 obtained in Preparations 1–8 (among them, those used in the compositions of the present invention are mixtures 1–3, 7 and 8 and the others are used for comparison) were stored at −10° C. for 6 months. No crystallization was caused and the mixtures were stable.

EXAMPLE 2

100 Parts by weight of silanol-terminated polydimethylsiloxane having a viscosity at 25° C. of 10,000 cP were mixed homogeneously with 13 parts of fumed silica of a specific surface area of 200 m$^2$/g which had been surface-treated with polydimethylsiloxane. The thus-obtained base composition was added with 6 parts of one of the cross-linking agent mixtures 1–6 and 0.1 part of dibutyltin dilaurate under a water vapor-free atmosphere, to obtain a homogeneous mixture. Thus, one package room-temperature-curing polydimethylsiloxane compositions a–f were obtained. The slump and the tack-free time of each composition was determined according to JIS A 5757 and the mechanical properties of the cured elastomer and the adhesion thereof to aluminum were determined according to JIS K 6301 after curing at a temperature of 25° C. at a relative humidity of 60% for five days. The results are shown in Table 1.

TABLE 1

| Composition | The Present Invention | | | Comparative Examples | | |
|---|---|---|---|---|---|---|
| | a | b | c | d | e | f |
| Cross-linking agent mixture No. | 1 | 2 | 3 | 4 | 5 | 6 |
| Slump (mm) | 0 | 0 | 0 | flowed down | flowed down | flowed down |
| Tack-free time (minutes) | 15 | 15 | 20 | 10 | 15 | 40 |
| Hardness | 29 | 24 | 28 | 30 | 28 | 16 |
| Tensile strength (Kg/cm$^2$) | 22 | 19 | 21 | 22 | 18 | 15 |
| Elongation (%) | 380 | 480 | 420 | 370 | 400 | 510 |
| Adhesion | good | good | good | partially peeled off | peeled off | peeled off |

EXAMPLE 3

100 Parts by weight of silanol-terminated polydimethylsiloxane having a viscosity at 25° C. of 20,000 cP were mixed homogeneously with 13 parts of fumed silica of a specific surface area of 300 m$^2$/g which had been surface-treated with hexamethyldisilazane. The thus-obtained base composition was added with 6 parts of cross-linking agent mixture 1, one of (a) 0.1 part of dibutyltin diacetate, (b) 0.1 part of dibutyltin dilaurate and (c) 0.1 part of dioctyltin dilaurate, as catalyst, to form compositions g, h and i. The tack-free time and the slump of the compositions were measured. For comparison, compositions j, k and l were prepared in the same manner as above except that 6 parts of a product obtained by the partial hydrolyzation of methyltriacetoxysilane with 0.1 mole of water were used in place of said cross-linking agent mixture 1. The tack-free time and slump were measured. The results are shown in Table 2.

TABLE 2

| Composition | The Present Invention | | | Comparative Examples | | |
| --- | --- | --- | --- | --- | --- | --- |
| | g | h | i | j | k | l |
| Tack-free time (mins.) | 10 | 15 | 25 | 5 | 5 | 5 |
| Slump (mm) | 0 | 0 | 0 | 0 | 0 | 0 |

(Note)
The catalysts were the same in j and g, in k and h, and in l and i.

From Table 2, it is understood that the curing rate of the compositions of the present invention can be controlled by changing the catalyst, while the curing rate of the compositions of the comparative examples is not altered even if the catalyst is changed.

EXAMPLE 4

A base composition was prepared by homogeneously mixing 65 parts of silanol-terminated polydimethylsiloxane of a viscosity at 25° C. of 120,000 cP, 35 parts of polydimethylsiloxane both ends of which are terminated with trimethylsilyl radicals having a viscosity at 25° C. of 100 cP and 12 parts of fumed silica of a specific surface area of 200 m$^2$/g which had been surface-treated with polydimethylsiloxane. 6 Parts of one of the cross-linking agent mixtures 1-3 and 0.05 part of dibutyltin diacetate were added to the base composition under a water vapor-free atmosphere and the whole was mixed homogeneously to obtain compositions m, n and o. The compositions were tested in the same manner as in Example 2. The results are shown in Table 3.

TABLE 3

| Composition | m | n | o |
| --- | --- | --- | --- |
| Cross-linking agent mixture No. | 1 | 2 | 3 |
| Slump (mm) | 0 | 0 | 0 |
| Tack-free time (mins.) | 9 | 12 | 15 |
| Hardness | 14 | 13 | 10 |
| Tensile strength (Kg/cm$^2$) | 19 | 18 | 13 |
| Elongation (%) | 720 | 830 | 900 |
| Adhesion | good | good | good |

EXAMPLE 5

113 Parts of the base composition used in Example 2 were mixed homogeneously with 6 parts of one of the cross-linking agent mixtures 7 and 8 and 0.15 part of dioctyltin dilaurate, under a water vapor-free atmosphere to form compositions p and q. The compositions were tested in the same manner as in Example 2. The results shown in Table 4 were obtained.

TABLE 4

| Composition | p | q |
| --- | --- | --- |
| Cross-linking agent mixture No. | 7 | 8 |
| Slump (mm) | 0 | 0 |
| Tack-free time (mins.) | 40 | 30 |

TABLE 4-continued

| Composition | p | q |
| --- | --- | --- |
| Hardness | 26 | 24 |
| Tensile strength (Kg/cm$^2$) | 21 | 19 |
| Elongation (%) | 470 | 520 |
| Adhesion | good | good |

EXAMPLE 6

100 Parts by weight of silanol-terminated polydiorganosiloxane comprising 5 molar % of diphenylsiloxy units and the remainder of dimethylsiloxy units and having a viscosity at 25° C. of 30,000 cP were mixed homogeneously with 13 parts of fumed silica of a specific surface area of 200 m$^2$/g which had been surface-treated with polydimethylsiloxane. The thus-obtained base composition was added with 6 parts of cross-linking agent mixture 1 and 0.1 part of dibutyltin dilaurate, under a water vapor-free atmosphere, and the whole was mixed homogeneously to obtain composition r, which was tested in the same manner as in Example 2. The following results were obtained:

| Slump (mm) | 0 |
| --- | --- |
| Tack-free time (mins.) | 35 |
| Hardness | 20 |
| Tensile strength (Kg/cm$^2$) | 22 |
| Elongation (%) | 550 |
| Adhesion | good |

The embodiments of the invention in which an exclusive property or privilege is claimed are defined as follows:

1. A room-temperature-curable polysiloxane composition consisting essentially of:
   (A) polydiorganosiloxane having silanol terminal radicals, said polydiorganosiloxane having a viscosity of 500 to 200,000 cSt at 25° C.,
   (B) from zero to 24.625 parts by weight, per 100 parts by weight of component (A), of acyloxy radical-containing organosilicon component selected from the group consisting of first compounds having the formula:

wherein $R^1$ and $R^2$, which can be the same or different, each is a monovalent, substituted or unsubstituted hydrocarbon radical,
partial hydrolyzates of said first compounds and mixtures thereof, and
   (C) from 0.0075 to 25 parts by weight, per 100 parts by weight of component (A), of organosilane component selected from the group consisting of second compounds having the formula:

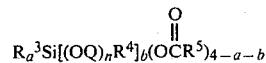

wherein $R^3$ is a monovalent, substituted or unsubstituted hydrocarbon radical, n is 1 or 2, Q is alkylene or alkylidene and when n is 2, Q can be the same or different, $R^4$ is an ester bond-containing radical having the formula:

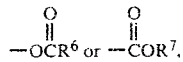

wherein $R^6$ and $R^7$ are monovalent, substituted or unsubstituted hydrocarbon radicals, $R^5$ is a monovalent radical selected from the group consisting of hydrogen and monovalent, substituted or unsubstituted hydrocarbon radicals, a is 0 or 1 and b is an integer of 1, 2, 3 or 4, partial hydrolyzates of said second compounds and mixtures thereof, the sum of components (B) and (C) being 0.5 to 25 parts by weight per 100 parts by weight of component (A), the amount of component (B) being from zero to 98.5 wt. % based on the sum of components (B) and (C), and the amount of component (C) being at least 1.5 wt. % based on the sum of components (B) and (C).

2. A composition according to claim 1 which contains an inorganic filler.

3. A composition according to claim 1 which contains a compound having a catalytic action for accelerating the reaction of components (A), (B) and (C).

4. A composition according to claim 1 wherein the organic radical bonded with the silicon atom in component (A) is a monovalent radical selected from the group consisting of monovalent hydrocarbon radicals, monovalent halogenated hydrocarbon radicals and cyanoethyl radical.

5. A composition according to claim 1 wherein the organic radical bonded with the silicon atom in component (A) is a monovalent hydrocarbon radical selected from the group consisting of methyl, vinyl and phenyl.

6. A composition according to claim 1 wherein the organic radical bonded with the silicon atom in component (A) is methyl.

7. A composition according to claim 1 wherein $R^1$ in component (B) is a monovalent hydrocarbon radical selected from the group consisting of alkyl having 1 to 8 carbon atoms, alkenyl having 2 or 3 carbon atoms and phenyl.

8. A composition according to claim 1 wherein $R^1$ in component (B) is methyl.

9. A composition according to claim 1 wherein $R^2$ in component (B) is a monovalent hydrocarbon radical selected from the group consisting of alkyl having 1 to 8 carbon atoms, alkenyl having 2 or 3 carbon atoms and phenyl.

10. A composition according to claim 1 wherein $R^2$ in component (B) is methyl.

11. A composition according to claim 1 wherein $R^3$ in component (C) is a monovalent radical selected from the group consisting of alkyl having 1 to 8 carbon atoms, alkenyl having 2 or 3 carbon atoms and phenyl.

12. A composition according to claim 1 wherein $R^3$ in component (C) is methyl.

13. A composition according to claim 1 wherein $R^4$ in component (C) is a radical of the general formula:

wherein $R^8$ is alkyl selected from the group consisting of methyl, ethyl and propyl.

14. A composition according to claim 1 wherein $R^4$ in component (C) is an acyloxy radical of the formula:

wherein $R^9$ is alkyl selected from the group consisting of methyl, ethyl and propyl.

15. A composition according to claim 1 wherein n in component (C) is 1 and Q is alkylene or alkylidene having 1 to 3 carbon atoms.

16. A composition according to claim 1 wherein n in component (C9 is 2, Q on the silicon atom side is ethylene and Q on the opposite side is alkylene having 1 or 2 carbon atoms.

17. A composition according to claim 1 wherein $R^5$ in component (C) is a monovalent radical selected from the group consisting of hydrogen, alkyl having 1 to 8 carbon atoms, alkenyl having 2 or 3 carbon atoms and phenyl.

18. A composition according to claim 1 wherein the sum of a and b in component (C) is up to 3.

19. A composition according to claim 1 wherein the amount of (C) is more than 20 wt. % based on the sum of (B) and (C).

20. A composition according to claim 1 wherein $R^1$ and $R^2$ are each a monovalent hydrocarbon radical substituted by a halogen atom or cyano radical; $R^3$ is a monovalent hydrocarbon radical substituted by a halogen atom or cyano radical; and $R^6$, $R^7$ and $R^5$ are each a monovalent hydrocarbon radical substituted by a halogen atom.

21. A composition according to claim 1 in which the sum of components (B) and (C) is from 2 to 10 parts by weight, per 100 parts by weight of component (A), the amount of component (C) is more than 20% by weight, based on the sum of the weights of components (B) and (C), and the amount of component (B) is more than 5% by weight, based on the sum of the weights of components (B) and (C).

* * * * *

UNITED STATES PATENT AND TRADEMARK OFFICE
CERTIFICATE OF CORRECTION

PATENT NO. : 4 301 269
DATED : November 17, 1981
INVENTOR(S) : Mitsuyoshi Hashimoto et al It is certified that error appears in the above—identified patent and that said Letters Patent is hereby corrected as shown below:

Column 12, line 62; change the formula to read as follows:

$$---R^3{}_a Si[(OQ)_n R^4]_b (O\overset{O}{\overset{\|}{C}}R^5)_{4-a-b}---.$$

Column 14, line 6; delete "general".

Column 14, line 26; change "(C9" to ---(C)---.

Column 14, line 37; before "(C)" insert ---component---.

Column 14, line 38; before "(B)" insert ---components---.

Signed and Sealed this

Thirtieth Day of March 1982

[SEAL]

Attest:

*Attesting Officer*

GERALD J. MOSSINGHOFF
*Commissioner of Patents and Trademarks*